July 9, 1946.   R. S. HOLMES ET AL   2,403,600
RECEIVER FOR PULSE POSITION INDICATING SYSTEMS
Filed Nov. 29, 1941   2 Sheets-Sheet 1
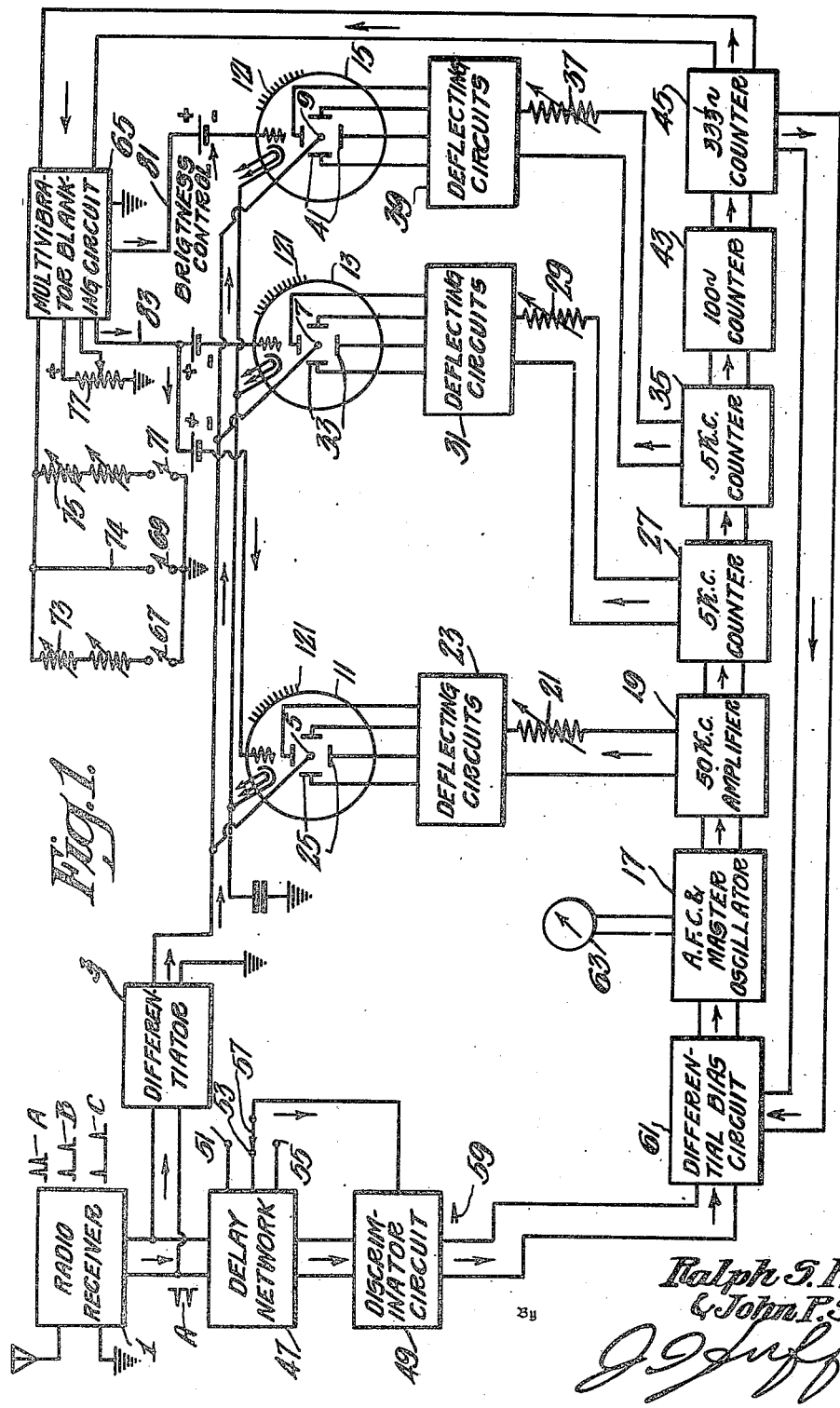
Inventors
Ralph S. Holmes
John P. Smith
By
Attorney

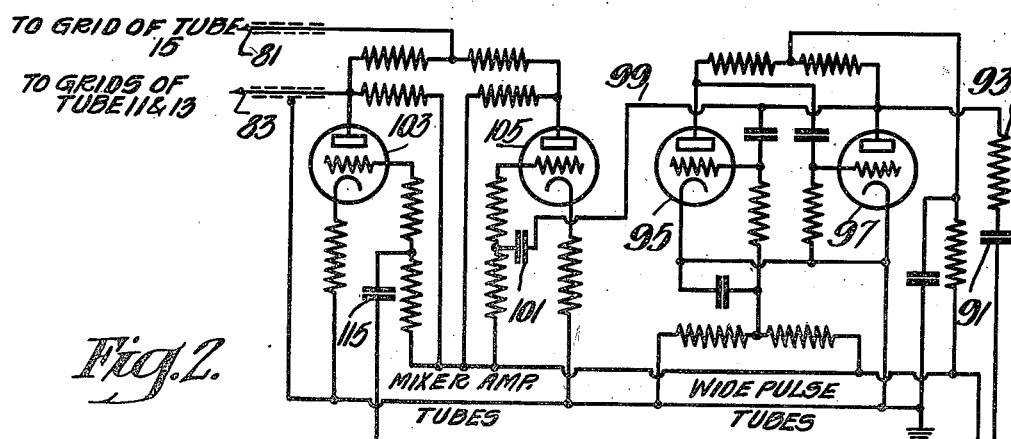
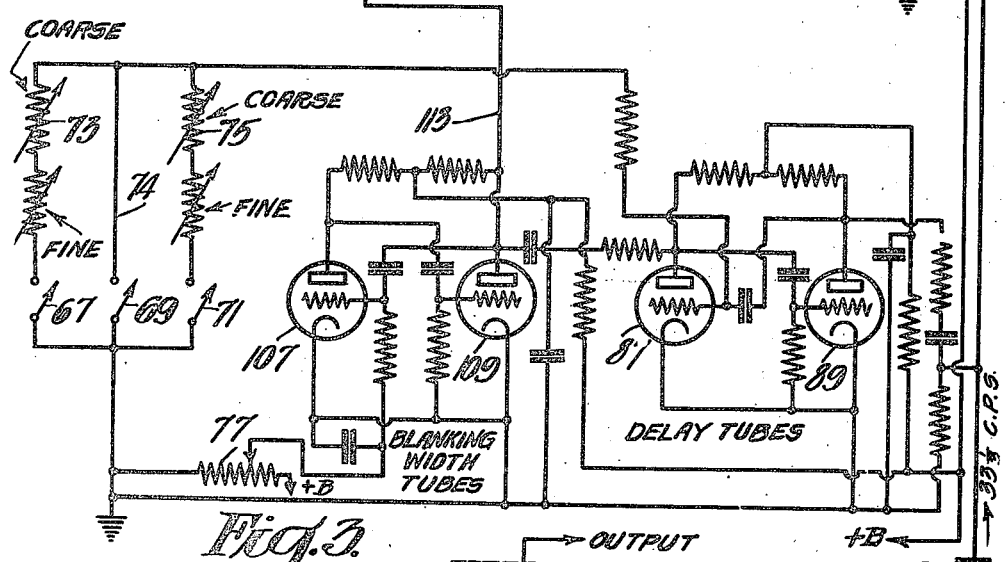
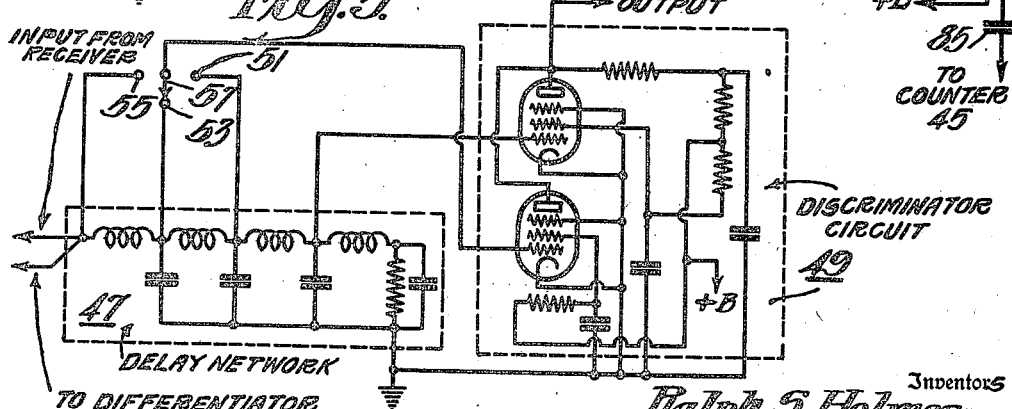

Patented July 9, 1946

2,403,600

UNITED STATES PATENT OFFICE 2,403,600

RECEIVER FOR PULSE POSITION INDICATING SYSTEMS

Ralph S. Holmes, Haddonfield, and John P. Smith, Erlton, N. J., assignors to Radio Corporation of America, a corporation of Delaware Application November 29, 1941, Serial No. 420,928

12 Claims. (Cl. 250—11)

This invention relates to improvements in receivers for a pulse position indicating system, and more particularly to a receiver and associated cathode ray pulse timing tubes which are provided with means for blanking undesired portions of the timing traces.

In a copending application Serial No. 420,944, filed November 29, 1941, by Irving Wolff and Ralph S. Holmes, a system is described for indicating position by means of radio pulses. The pulses are radiated in predetermined time relation from a plurality of transmitters at known locations. The pulses are received at an unknown point. By observing the relative times of arrival of signals from three transmitters, the location of the point of reception can be fixed with respect to the pulse signal sources. In the described system cathode ray tubes are used as decade timing indicators. The cathode ray beams of the several tubes are rotated at high angular velocities; for example, 100, 10 and 1 kilocycle per second. Since the pulse duration is of the order of a microsecond or less, and the pulse repetition frequency is relatively low, it follows that the beam rotating at 100 kilocycles per second will make many revolutions for a single radial deflection corresponding to an applied pulse. Therefore, the resultant radial trace can be distinguished from the circular trace only with difficulty.

In a similar manner the more numerous circular or timing traces in any of the timing tubes tend to obscure the less frequent radial or signal traces. One of the objects of the instant invention is to provide improved timing means for indicating the reception of radio pulses. Another object is to provide an improved cathode ray pulse timing system in which the cathode ray timing traces are blanked out except during the interval including the signal trace. Another object is to provide an improved decade type of cathode ray pulse timer in which the cathode ray timing sweeps may be applied to the fluorescent screen during any desired portion of each timing sweep and biased off during undesired portions of the sweep whereby the signal traces may be readily discerned.

The invention will be described by referring to the accompanying drawings, in which Fig. 1 is a schematic diagram of one embodiment of the invention; Fig. 2 is a diagram of the blanking circuits used in the invention; and Fig. 3 is a circuit diagram of a delay network and discriminator circuit. Similar reference characters are applied to similar elements in the several figures.

Referring to Fig. 1, a radio pulse receiver 1 is connected through a differentiator 3 to the radial deflecting electrodes 5, 7 and 9 of the cathode ray tubes 11, 13 and 15, respectively. The voltages for rotating the cathode ray beams are obtained as follows: A master oscillator 17, which is frequency controlled as hereinafter described, is connected through an amplifier 19 and variable resistor to a deflecting circuit. The deflecting circuit includes a conventional phase splitter 23, which proves a two-phase output. The two-phase output currents are applied to the deflecting elements 25 of the first cathode ray tube 11.

The master oscillator amplifier 19 is also connected to a 10 to 1 counter circuit 27 which reduces the initial frequency by a factor of 10, if the timing devices are to be of the decade type. The output of the counter circuit 27 is applied through a variable resistor 29 and a deflecting circuit 31, which includes a phase splitter, to the deflecting elements 33 of the second cathode ray tube 13. The output of the counter circuit 27 is applied to a second 10 to 1 counter circuit 35. The output of the second counter circuit is applied through a variable resistor 37 and a deflecting circuit 39, which includes a phase splitter, to the deflecting elements 41 of the third cathode ray tube 15.

Although not claimed as part of the instant invention, it is necessary to describe the nature of the received pulses because components thereof are combined with local currents, derived from the master oscillator and the successive counters terminating in counter 45, which are actuated by the master oscillator 17, to control master oscillator frequency and to synchronize the master oscillator with the incoming pulses from one of the transmitters. The transmitters are each arranged to radiate pairs of pulses. For example, the first transmitter radiates two pulses with a five microsecond spacing; the second transmitter radiates two pulses with a ten microseconds spacing; and the third transmitter radiates two pulses with a fifteen microseconds spacing. It should be understood that the pairs of pulses are radiated continuously from each transmitter at a rate of 33⅓ pairs per second. These pulses are represented as pairs A, B and C at the receiver.

These pairs of pulses are fed from the receiver 1 through a delay network 47 to a discriminator 49 which is responsive only to pulses applied coincidentally. The delay network is tapped at three points, 51, 53 and 55, so that any one of three time constants may be selected. The first time constant is chosen to bring together at the discriminator 49 the pulses forming pair A; the second time constant brings together the pulses of pair B; and the third time constant brings together the pulses of pair C. The discriminator 49 may be operated by any pair of coincidentally applied pulses, which are selected by the delay network switch 57. The output from the discriminator consists of single pulses 59 which occur at the 33⅓ per second repetition rate of the pairs.

A balanced modulator or differential bias circuit 61 is connected to an automatic frequency control circuit which is a part of the local master oscillator 17. Pulses 59 from the discriminator 49 and currents from the counter 45 are applied to the inputs of the differential bias circuit. If the phase or frequency does not shift, the output of the differential circuit will be zero. If the phase of the local 33⅓ cycles per second current changes with respect to the pulses, the differential circuit output will be of a polarity and of an amplitude suitable to increase or decrease, as may be required, the master oscillator frequency. Thus the frequency of the master oscillator is locked in to the incoming pulse frequency. The range of lock-in may be indicated on a meter 63 connected to the AFC and master oscillator circuit 17.

In the arrangement thus described the cathode ray beams of the three cathode ray tubes 11, 13 and 15 are rotated by the currents derived from the master oscillator. The last tube 15, because of its low timing rate of .5 kilocycle per second, will indicate only large differences in the times of arrival of the pairs of pulses A, B and C. The second tube 13, because of its intermediate timing rate of 5 kilocycles per second, will indicate intermediate time differences. The vernier tube 11, because of its relatively high timing rate, will indicate slight or vernier differences in the pulse arrival times.

As pointed out above, the low pulse frequency and the relatively high timing frequency make it difficult to observe the radial traces produced by the pulses. This difficulty is overcome by applying the local currents of the pulse repetition frequency of 33⅓ cycles per second to a multivibrator blanking circuit 65. The multivibrator circuit, which will be described hereinafter, includes switches 67, 69 and 71 for connecting adjustable resistors 73, 75 or a short circuit connection 74 across elements of the circuit to vary its time or delay characteristic. Another resistor 77 is used to vary the width of the blanking pulse. The output currents of the multivibrator are applied through leads 81 and 83 to the grids of the several cathode ray tubes to blank out the beam except during a brief interval including the received pulses. While it is customary to describe the pulses as blanking pulses, it should be understood the blanking is effected by a combination of a steady grid biasing potential plus an additional potential which, when applied to the grid, allows the cathode rays to reach the fluorescent screen. As used herein, the term blanking applies to the effective combination of cathode ray biasing forces.

Referring to Fig. 2, the output of the counter 45 of Fig. 1 is applied through a capacitor 85 to a pair of thermionic tubes 87, 89 which are connected as a multivibrator. These tubes serve as delay tubes. The manner of using a multivibrator as a delay tube is to make the output rectangular wave of any desired length. By using the back or trailing edge of the rectangular wave to initiate or start a second multivibrator, the time delay may be adjusted by adjusting the length of the first rectangular wave. The means for selecting and adjusting the delay includes resistors 73, 75 and the conductor 74 and the signal selector switches 67, 69 and 71. The currents from the counter 45 are also applied through a capacitor 91 and resistor 93 to a second pair of tubes 95, 97 which are also connected as a multivibrator. The second multivibrator is used to produce a wide pulse. The output of the second multivibrator is applied through lead 99 and capacitor 101 to a pair of mixer tubes 103, 105 which may also serve as amplifiers.

Narrow pulses are obtained by applying the output from the delay tubes 87, 89 to a third multivibrator which includes a pair of thermionic tubes 107, 109 and the adjustable resistor 77. The resistor 77 controls the width of the blanking pulses. The narrow pulses are applied through a lead 113 and a capacitor 115 to one of the mixer amplifier tubes 103. The wide and narrow pulses are combined in the mixer amplifier and are applied through the lead 81 to the grid of the cathode ray tube 15, whose beam is rotated most slowly. The narrow pulses of adjustable width are applied by means of the lead 83 to the grids of the cathode ray tubes 11 and 13, whose beams rotate more rapidly than the beam blanked by both wide and narrow pulses.

In practice, three pairs of spaced pulses are received. A pair of signal pulses A is applied to deflect radially the beams of the cathode ray tubes as the beams pass the zero or other reference marks of the tube scales 121. Since this requires no delay, the switch 69 is closed to blank the beams for all but the region near zero. The width of the narrow blanking pulses is controlled by adjusting the width control resistor 77. Inasmuch as the blanking pulses are synchronized with the low frequency current derived from the master oscillator 17, it follows that the blanking pulses will be synchronized with the incoming pulses because the incoming pulses also control the master oscillator. Thus the blanking, local master oscillator, and received pulses are locked in synchronism.

When the pulse signals B from the second station are to be indicated, the switch 67 is opened; the switch 67 is closed; and the resistors 73 are adjusted until the required amount of delay is obtained. In a similar manner, when the pulse signals C from the third station are to be received, the switches 67 and 69 are opened; the switch 71 is closed; and the resistors 75 are adjusted until the proper delay is obtained. The described blanking pulse delay should not be confused with the delay which is obtained in the delay network 47 to make the pulses of a pair coincide. The blanking pulse delay is used to apply the cathode ray beams to the fluorescent screens of the cathode ray tubes during the instant when a particular pair of pulses is received and to bias off the beam during all other periods. In the instant arrangement, the operator selects the signals by closing any one of the signal selector switches 67, 69 and 71, and adjusts manually the delay which corresponds to the differences in the time required for the pulses to travel from their respective transmitters to the receiver. A circuit for automatic operation is described and claimed in application Serial No. 420,919, filed November 29, 1941, by John P. Smith, for Cathode ray pulse indicator.

As for the elements of the system, the receiver I may be a superheterodyne, tuned radio frequency amplifier or any device responsive to the pulse transmitters. The differentiator 3 may be of the type disclosed in U. S. Patent No. 2,132,655. The delay network 47 may be a conventional filter with taps at the desired intervals. The delay network 47 and the discriminator 49 may be of the design shown in Fig. 3. A suitable form of differential bias circuit 61 is a balanced modulator or a circuit of the type disclosed in U. S. Patent 2,250,284, which issued to K. R. Wendt on July 22, 1941. The frequency dividers or counters 27, 35, 43 and 45 may be of the type described in U. S. Patent 2,258,943, which issued to A. V. Bedford on October 14, 1941. The master oscillator, automatic frequency control, deflecting circuits, and cathode ray tube circuits, which are well known to those skilled in the art, do not require any detailed disclosure.

In the operation of the described system, the pairs of pulses, which are transmitted in predetermined time relation from a plurality of transmitters at known locations, are received. The first pair of pulses to arrive is preferably used to synchronize the local oscillator and to indicate the reference or zero time of reception. The zero may be checked by operating the signal selector switch 69. On cathode ray tube 15 pulses are seen at all times at half brilliancy due to the application of both wide and narrow selector pulses. By properly timing the narrow selector pulse, any particular pair of pulses may be brought to full brilliancy on tube 15 to thus aid in selecting the corresponding pair on the two vernier tubes 11 and 13. On the vernier of tubes 11 and 13 the beam is blanked for all angular rotations of the beam except at the times including the arrival of the pair of pulses A. Thereafter, the interval of time between the arrival of the A and B pairs of pulses and the interval between the arrival of the A and C pairs of pulses may be indicated by operating the switches 67 and 71 provided the associated resistors have been adjusted to provide the desired blanking delay. It should be understood that, while both pulses of the pairs are shown on the screen, the pulses of a pair could be made coincidental by selecting the deflecting pulses after the pairs of signal pulses pass through the discriminator circuit.

We claim as our invention:

1. A radio pulse position indicating device including means for receiving pulses of radio energy radiated in predetermined relation from a plurality of known locations, a source of local oscillations, a timing indicator, means connecting said source and said indicator for applying said oscillations to drive said indicator at a substantially constant rate, means for generating blanking pulses, means connecting said blanking pulse means to said indicator for applying said blanking pulses to said timing indicator to eliminate all but a predetermined portion of said timing indications, and means connecting said receiving means to said indicator for applying said received pulses to said indicator to indicate the differences in times of said pulse reception thereby to indicate the position of said receiver with respect to said known locations.

2. A radio pulse position indicating device including means for receiving pulses of radio energy radiated in predetermined relation from a plurality of known locations, a source of local oscillations, a timing indicator, means connecting said source to said indicator for applying said oscillations to drive said indicator at a substantially constant rate, means connecting said receiver and local source for synchronizing said local oscillations and said pulses, means for generating blanking pulses, means connecting said blanking pulse means to said indicator for applying said blanking pulses to said timing indicator to eliminate all but a predetermined portion of said timing indications, and means connecting said receiving means to said indicator for applying said received pulses to said indicator to indicate the differences in times of said pulse reception thereby to indicate the position of said receiver with respect to said known locations.

3. A radio pulse position indicating device including means for receiving pulses of radio energy radiated in predetermined relation from a plurality of known locations, a source of local oscillations, a timing indicator, means connecting said source to said indicator for applying said oscillations to drive said indicator at a substantially constant rate, means for generating blanking pulses, means effectively coupling said source of local oscillations and said pulse generating means for synchronizing said blanking pulses with said local oscillations, means connecting said blanking pulse means to said indicator for applying said blanking pulses to said timing indicator to eliminate all but a predetermined portion of said timing indications, and means connecting said receiving means to said indicator for applying said received pulses to said indicator to indicate the differences in times of said pulse reception thereby to indicate the position of said receiver with respect to said known locations.

4. A radio pulse position indicating device including means for receiving pulses of radio energy radiated in predetermined relation from a plurality of known locations, a source of local oscillations, a timing indicator, means connecting said source to said indicator for applying said oscillations to drive said indicator at a substantially constant rate, means connecting said receiver and local source for synchronizing said local oscillations and said pulses, means for generating blanking pulses, means effectively coupling said source of local oscillations and said pulse generating means for synchronizing said blanking pulses with said local oscillations, means connecting said blanking pulse means to said indicator for applying said blanking pulses to said timing indicator to eliminate all but a predetermined portion of said timing indications, and means connecting said receiving means to said indicator for applying said received pulses to said indicator to indicate the differences in times of said pulse reception thereby to indicate the position of said receiver with respect to said known locations.

5. A device according to claim 1 including means for adjusting the width of said blanking pulses.

6. A device according to claim 1 including means for delaying the application of said blanking pulses so that said timing indications are discernible at the times of reception of said pulses.

7. A radio pulse position indicating device including a pulse receiver, a cathode ray timing device including a fluorescent screen, a source of oscillations, means connecting said source to said timing device for applying said oscillations to drive said cathode ray as a timing indicator, means for blanking said ray from said screen, means connecting said receiver and said device for deflecting said ray upon reception of pulses, and means for applying a biasing force to said ray thereby to apply said ray to said screen during the deflection of said ray.

8. A radio pulse position indicating device including a pulse receiver, a cathode ray tube including a fluorescent screen and deflecting elements, a source of oscillations, means connecting said source to said tube for applying said oscillations to said deflecting elements to deflect said ray in synchronism with said oscillations, means connected to said tube for normally biasing said ray off said screen, means connected to said tube and said receiver to further deflect said ray, biasing means connected to said tube for applying said ray to said screen during the interval including said further deflection, and means for synchronizing said ray bias applying means with said local oscillations.

9. A radio pulse position indicating device including a pulse receiver, a cathode ray tube including a fluorescent screen and deflecting elements, a source of oscillations, means connecting said source to said tube for applying said oscillations to said deflecting elements to rotate said ray in synchronism with said oscillations, means connected to said tube for normally biasing said rotating ray off said screen, means connected to said tube and said receiver to radially deflect said rotated ray, biasing means connected to said tube for applying said ray to said screen during the interval including the radial deflection of said ray, and means for synchronizing said ray bias applying means with said local oscillations.

10. A device of the character of claim 9 including means for adjusting the length of the interval during which said ray is applied to said screen.

11. A radio pulse position indicating device including a pulse receiver, a cathode ray tube including a fluorescent screen and deflecting elements, a source of oscillations, means for applying said oscillations to said deflecting elements to deflect said ray in synchronism with said oscillations, means connected to said receiver and to said tube for further deflecting said ray to indicate reception of said pulses, and cathode ray blanking means connected to said tube and said source of oscillations including delay tubes connected together as multivibrators and controlled by said oscillations whereby said ray may be biased onto said screen during said further deflection.

12. A device according to claim 11 including a second pair of tubes connected together as a multivibrator and connected to said delay tubes for controlling the width of said blanking pulses.

RALPH S. HOLMES.
JOHN P. SMITH.